Figure 1:
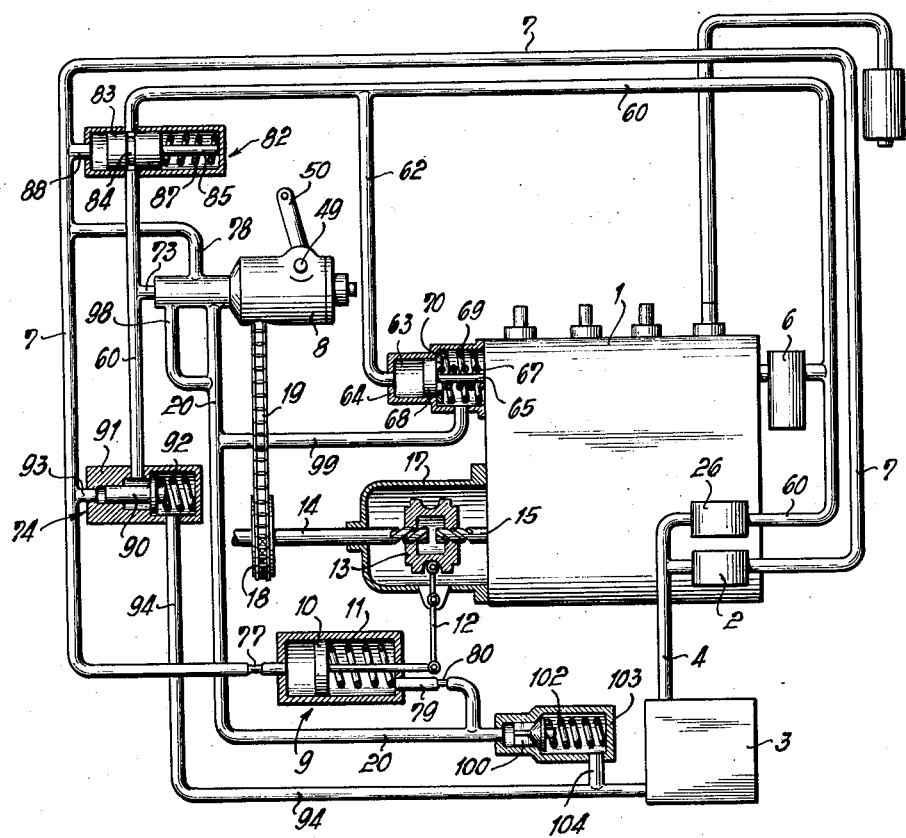

Sept. 1, 1959 U. ALDINGER ET AL 2,902,019
FUEL SUPPLY SYSTEM FOR INTERNAL COMBUSTION ENGINES
Filed April 9, 1958 2 Sheets-Sheet 1

INVENTORS
Ulrich Aldinger
Frank Chaine
by: Michael S. Striker
Attorney

Sept. 1, 1959   U. ALDINGER ET AL   2,902,019
FUEL SUPPLY SYSTEM FOR INTERNAL COMBUSTION ENGINES
Filed April 9, 1958   2 Sheets-Sheet 2
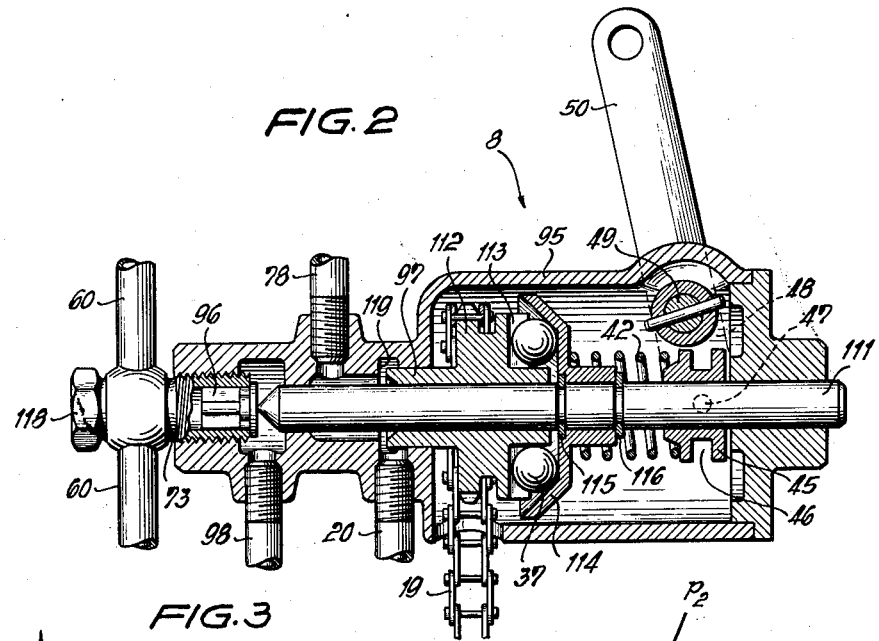
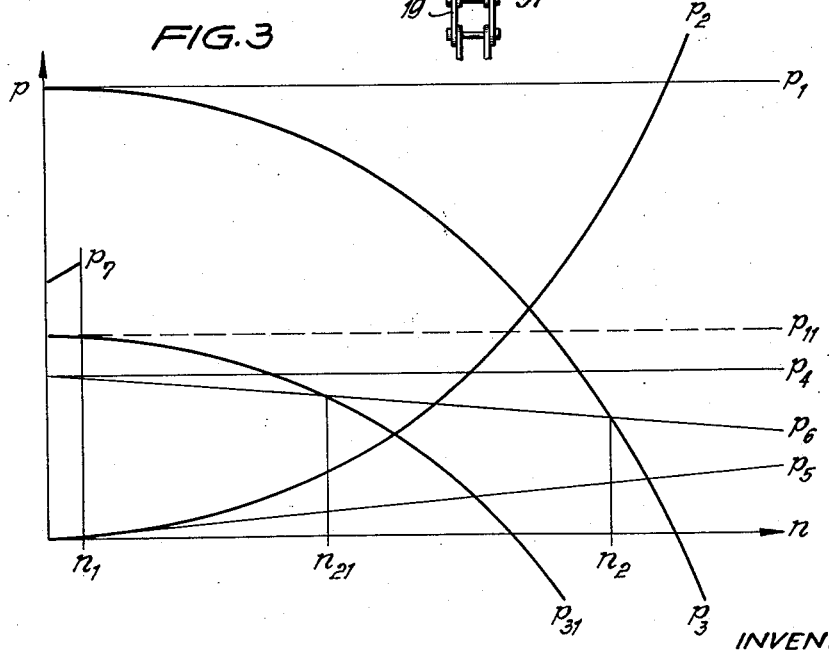
INVENTORS
Ulrich Aldinger
Franz Eheim
by: Michael S. Striker
Attorney

United States Patent Office 2,902,019
Patented Sept. 1, 1959

2,902,019

FUEL SUPPLY SYSTEM FOR INTERNAL COMBUSTION ENGINES

Ulrich Aldinger and Franz Eheim, Stuttgart, Germany, assignors to Robert Bosch G.m.b.H., Stuttgart, Germany Application April 9, 1958, Serial No. 727,455

Claims priority, application Germany April 13, 1957

13 Claims. (Cl. 123—140)

The present invention relates to internal combustion engines.

More particularly, the present invention relates to fuel supply systems for internal combustion engines.

Injection pumps which supply fuel to an internal combustion engine in general have two principal controls, one controlling regulating the timing of the injection pump and the other control regulating the amounts of fuel delivered by the injection pump to the cylinders of the engine. These controls are actuated in accordance with such factors as the speed of the engine, the operations of the operator, and the maximum amounts of fuel which can be efficiently burned in the engine. At the present time, the known devices which act on the injection pump controls, particularly where these devices are mechanical, are of relatively complex construction and require a considerable amount of space.

One of the objects of the present invention is to provide a fuel supply system wherein the injection pump controls are acted upon by a relatively simple structure which takes up a relatively small amount of space.

Another object of the present invention is to provide in a fuel supply system a fully hydraulic, rather than mechanical, arrangement for acting on the control which regulates the amounts of fuel delivered by the injection pump as well as on the control which regulates the timing of the injection pump.

A further object of the present invention is to provide a fuel supply system of the above type which guarantees that at no time does the injection pump deliver to the engine more fuel than can be efficiently burned in the cylinders thereof.

An additional object of the present invention is to provide in a fuel supply system of the above type a means which automatically causes more than the full load amounts of fuel to be delivered by the injection pump to the engine when the latter is being started.

It is also an object of the present invention to provide in a fuel supply system of the above type a means which limits the amounts of fuel delivered to the engine to the maximum amounts which can be efficiently burned thereby up to predetermined speeds of the engine determined by the operator and which automatically causes the injection pump to deliver to the engine amounts of fuel less than those amounts which can be efficiently burned thereby at speeds above these speeds which are determined by the operator.

Still another object of the present invention is to provide a single centrifugal regulating arrangement capable of participating in the regulation of both the timing of the injection pump and the amounts of fuel delivered thereby.

With the above objects in view, the present invention includes in a fuel supply system for an internal combustion engine an injection pump and first and second hydraulic regulating means cooperating with the injection pump for respectively regulating the amounts of fuel delivered thereby and the timing thereof. In accordance with the present invention, first and second overflow valve means cooperate with the first and second regulating means for controlling the pressure of the fluid acting on the first and second regulating means, and also in accordance with the present invention a single centrifugal means cooperates with both the first and the second overflow valve means for operating the latter according to the speed of the engine from which the centrifugal means is driven.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 schematically illustrates the entire organization of the present invention;

Fig. 2 is an axial sectional view on an enlarged scale of part of the control means of the fuel supply system of the present invention; and Fig. 3 is a pressure-speed graph illustrating the operation of various parts of the structure of the invention.

Referring now to Fig. 1, there is indicated therein the injection pump 1 and the supply pumps 2 and 26 which are mounted on the injection pump 1 and which cooperate through a conduit 4 with the reservoir 3 for sucking fuel therefrom. The supply pump 26 delivers fuel under pressure through the conduit 60 and a filter 6 to the injection pump 1, and the conduit 60 extends beyond the filter 6 for carrying fuel to other parts of the structure of the invention.

A conduit 62 branches from and communicates with the conduit 60 and communicates with the pressure chamber 63 of a cylinder 64 which forms part of a hydraulic regulating means for regulating the amounts of fuel delivered by the pump 1 to the cylinders of the engine. These amounts of fuel delivered by the injtction pump 1 are regulated in a known way according to the axial position of the rod 65 which is connected with a piston 68 slidable in the cylinder 64 and acted upon by a spring 67 to be urged to the left, as viewed in Fig. 1, against the force of the fluid in the chamber 63. Thus, the axial position of the rod 65 will be determined by the position of the piston 68 which is fixed to the rod 65. A ring 70 is urged by a spring 69 in the right end of the cylinder 64, as viewed in Fig. 1, against a shoulder located intermediate the ends of the stepped cylinder 64, and the inner periphery of the ring 70 has a diameter smaller than that of the piston 68 so that the ring 70 forms a yieldable stop yieldably limiting the movement of the piston 68 to the right, as viewed in Fig. 1, to the position of the piston 68 shown in Fig. 1, this position being the position at which the injection pump delivers amounts of fuel for operating the engine at full load. Thus, the ring 70 acted upon by the spring 69 forms a full load yieldable stop means for the piston 68. The pressure in the conduits 60 and 62, which is the same as the pressure of the fluid in the chamber 63, is determined, as described below, by a regulating device 8 forming part of the control means of the structure of the invention, and this regulating device 8 communicates with the conduit 60 through a conduit 73 conected with the left end of the device 8, as viewed in Fig. 1. The presuure of the fluid in the chamber 63 is also regulated in part by an overflow valve means 74 which communicates with the conduit 60 and which is described below.

The supply pump 2 delivers the fuel under pressure from the reservoir 3 to a conduit 7 which communicates with a cylinder 9 of a second hydraulic regulating means which controls the timing of the injection pump 1. This conduit 7 is provided just upstream of the cylinder 9 with a restricted portion 77 forming part of a throttling means, this restricted portion 77 throttling the flow of the fuel into the cylinder 9 to the left of the piston 10 which is slidable therein, as viewed in Fig. 1. A spring 11 in the cylinder 9 acts on the piston 10 to urge the latter to the left, as viewed in Fig. 1, against the fluid pressure urging the piston to the right, and the piston 10 is also urged to the left, as viewed in Fig. 1, by the pressure of fuel delivered into the cylinder 9 at the right of the piston 10 through a conduit 79 having a restricted portion 80 which forms the other part of the throttling means cooperating with the hydraulic regulating means 9—11. Thus, the restricted portions 77 and 80 cooperate together to form a throttling means for throttling the flow of fluid to and from the hydraulic regulating means 9—11 which regulates the timing of the injection pump 1. A conduit 78 branches from the conduit 7 and leads to the device 8 so that the latter also communicates with the conduit 7.

The piston rod which is fixed to the piston 10 is connected through a pin and slot connection, for example, with a two-armed lever 12 which is pivotally supported intermediate its ends on part of a casing 17 which houses a member 13 which cooperates with the lever 12 to be moved by the latter to the left or right, as viewed in Fig. 1, in response to movement of the piston 10. The member 13 has a pair of opposed wall portions formed with coaxial threaded openings having threads of relatively large pitch, and a pair of coaxial shafts 14 and 15 respectively have threaded end portions extending through these openings and cooperating threadedly with the member 13, the pitch of these threads being large enough to cause axial shifting of the member 13 to result in angular turning of the shafts 14 and 15 with respect to each other so that the movement of the piston 10 acts through elements 12 and 13 to regulate the angular positions of the shafts 14 and 15 with respect to each other. The shaft 14 is connected through a suitable transmission with the engine to be rotated thereby, and the shaft 15 forms the drive shaft of the injection pump. The shaft 14 fixedly carries a sprocket wheel 18 which rotates therewith and which drives the control device 8 through the chain 19.

An additional valve means is located in and cooperates with the conduit 60 at a part thereof located between the conduit 62 and the device 8 for preventing fuel from reaching conduit 73 when the engine is started and until the engine reaches a given speed. This additional valve means includes a cylinder 82 in which a piston 83 is slidable, this piston 83 forming the valve member of the valve means and being provided intermediate its ends with an annular groove 84. An elongated stop pin 85 is fixed to and extends to the right from the piston 83, as viewed in Fig. 1, so that when the right free end of the pin 85 engages the right end wall of the cylinder 82, as shown in Fig. 1, the movement of the piston 83 to the right is terminated, and in this end position of the piston 83 the groove 84 communicates with the conduit 60 to permit fuel to flow therethrough to the conduit 73. A spring 87 acts on the piston 83 to urge the latter to the left, as viewed in Fig. 1, and the left face of the piston 83 is acted upon by the fluid under pressure in the conduit 7, the left end of the cylinder 82 communicating with the conduit 7 through a conduit 88.

The above-mentioned overflow valve means 74 which communicates with and is connected to the end of the conduit 60 includes a cylindrical housing 91 in which a valve member 90 is axially shiftable, the elongated left free end portion of valve member 90 acting as a piston slidable in a cylindrical portion of the housing 91 which communicates through the conduit 93 with the conduit 7 so that the pressure of the fuel in the conduit 7 acts on the left end face of the valve member 90 to urge the latter to the right, as viewed in Fig. 1. Between the left cylindrical portion of housing 91 in which the piston portion of valve member 90 slides and the right enlarged cylindrical portion of the housing 91 which receives the spring 92 there is an intermediate cylindrical portion of the housing 91 which communicates with the end of the conduit 60, and this intermediate interior portion of the housing 91 is closed in the position of the overflow valve means 74 shown in Fig. 1, the spring 92 acting on a collar fixed to and carried by the valve member 90 for urging this collar against a shoulder of the housing 91 to close the intermediate chamber thereof. The spring 92 acts in opposition to the pressure of the fluid in the conduit 7. The right chamber of the housing 91 in which the spring 92 is located communicates with a conduit 94 which returns the fuel to the reservoir 3, so that when the valve member 90 is positioned to the right of its position shown in Fig. 1 in order to open the intermediate chamber of the housing 91 the fuel in conduit 60 will be able to flow through the overflow valve means 74 along the conduit 94 back to the reservoir 3.

The control device 8 includes a casing 95 which carries a pair of overflow valve means which respectively communicate through the conduit means 73, 60 with the hydraulic regulating means 63, 64, 65, 67, 68, 69, 70 for regulating the amounts of fuel delivered by the injection pump and through the conduit means 78, 7 with the hydraulic regulating means 9—11 which regulates the timing of the pump. As may be seen from Fig. 2, the overflow valve means which communicates with the conduit means 73, 60 includes an axially shiftable valve member 96 having a plurality of fins slidably engaging at their outer edges the inner surface of the right end portion of the conduit 73, as viewed in Fig. 2, and having fixed to the right end of these fins a stem portion of a smaller diameter than the interior diameter of the conduit 73, this stem portion having fixed to its right end, as viewed in Fig. 2, a plate larger than the inner diameter of conduit 73 for closing the latter when this plate is located in engagement with the right end of the conduit 73, which is the position of the overflow valve means shown in Fig. 2. The overflow valve means which communicates with the conduit means 78, 7 includes an elongated cylindrical valve member 97 which forms an elongated hub of a motion transmitting member 112 and which cooperates with a valve seat 119 formed by an annular surface of the casing 95 which surrounds the shaft 111 on which the motion transmitting member 112 together with its elongated hub 97 is axially shiftable.

In the position of this latter overflow valve means which is shown in Fig. 2 the valve member 97 is located to the right away from the seat 119 so that this overflow valve means is shown in an open position in Fig. 2 and the fuel can flow from the conduit 78 through the interior of the casing 95 to the conduit 20 which forms part of a return conduit means for directing fuel back to the reservoir 3. When the valve member 96 is located to the right of the position thereof shown in Fig. 2, the overflow valve means which cooperates with the conduit means 73, 60 is in an open position and the fuel can then flow through another interior portion of the casing 95 to the conduit 98 which communicates downstream of the device 8 with the conduit 20, so that the conduits 98 and 20 form a return flow conduit means for leading the fuel back to the reservoir 3. A conduit 99 also branches from the conduit 20, and this conduit 99 communicates with the chamber of the cylinder 64 at the right of the piston 68, this chamber housing the springs 67 and 69. The conduit 79 which communicates with the right end of the cylinder 9 also leads to the return flow conduit 20. Downstream of the connection between conduit 79 and 20, the latter has operatively connected therewith an overflow valve means 100—103 which includes a housing 103 housing in its interior a spring 102 which urges the valve member 100 to the closed position thereof shown in Fig. 1. When the valve 100 is in an open position the fuel flows from the conduit 20 through the housing 103 to a conduit 104 which communicates with the return flow conduit 94.

As may be seen from Fig. 2, the casing 95 supports the shaft 111 for axial shifting movement, and the left end of this shaft 111, as viewed in Fig. 2, is located adjacent to the overflow valve means which includes the valve member 96 so that when this shaft 111 is in the left end position thereof shown in Fig. 2 it maintains the valve member 96 in this closed position. The motion transmitting member 112 is in the form of a sprocket wheel which is freely turnable on the shaft 111 as well as axially movable therealong, and the sprocket chain 19 cooperates with the sprocket wheel 112 so that this motion transmitting member 112 is driven from the engine at a speed corresponding to the engine speed. The right face of the sprocket wheel 112, as viewed in Fig. 2, is provided with a plurality of axially extending projections distributed circumferentially about the shaft 111 and extending substantially radially therefrom so as to form a plurality of compartments which respectively receive centrifugal weights in the form of the ball members 37, and this right portion of the motion transmitting member 112 forms a cage 113 for the ball members 37 to cause the latter to rotate with the member 112 without restricting in any way the radial movement of the weights 37 toward and away from the axis of the shaft 111. A disc 114 is connected with the shaft 111 for axial movement therewith through the medium of a pair of snap rings 115 and 116 respectively located in a pair of annular grooves of the shaft 111 and engaging the ends, respectively, of the hub of the disc 114. Thus, this disc is compelled to shift axially with the shaft 111. The outer periphery of the disc 114 is of frusto-conical configuration so that the disc defines with the motion transmitting member 112 an annular chamber surrounding the shaft 111 and gradually diminishing in its axial cross-sectional area on each side of the shaft 111 in a direction extending radially away from the shaft 111, so that when the weights 37 in this annular chamber are urged radially away from the axis of the shaft 111 they will, on the one hand, urge member 112 together with valve member 97 to the left, and, on the other hand, urge the disc 114 together with shaft 111 to the right, as viewed in Fig. 2. There is sufficient play in the chain 119 to prevent the latter from providing any appreciable resistance to the shifting of the valve member 97 axially along the shaft 111. A coil spring 42 surrounds the shaft 111 and bears with its left end, as viewed in Fig. 2, against the disc 114. The right end of this spring bears against a ring 45 which is axially shiftable along the shaft 111, so that the spring 42 acts through the disc 114 and the shaft 111 on the valve member 96 to serve as a spring means for urging the overflow valve means which communicates with the conduit means 73, 60 to a closed position. The ring 45 is formed with an annular groove 46 which receives in its interior a pin 47 fixed to a lever 48 which is, in turn, fixed with the shaft 49 for turning movement with the latter, this shaft 49 being turnably supported by the casing 95 and being connected with another lever 50 which is turned by the operator, so that with this construction the operator controls the axial position of the ring 45 so that the extent to which the spring 42 is compressed is determined by the will of the operator. A hollow nipple 118 is threadedly connected with the left end of the casing 95 and has a tubular portion which forms the conduit 73, this nipple 118 serving to provide communication between conduit 73 and conduit 60. In the position of the parts shown in Fig. 2 the ball members 37 have a certain axial play between member 112 and disc 114 so that the valve member 97 is spaced from the seat 119 at this time.

The operator turns the lever 50 to regulate the compression of the spring 42 in order to adjust the engine speed according to the will of the operator, and as long as the weights 37 do not act axially on the disc 114 with a force sufficient to overcome the force of the spring 42 the shaft 111 bears with its left end against the valve member 96.

The force of the spring 102 of the overflow valve members 100—103 is only great enough to permit this valve means to open when the fluid pressure in conduit 20 upstream thereof is slightly greater than atmospheric pressure, and the valve members 96 and 97 at their downstream sides are at the pressure determined by the spring 102. However, upstream of the valve members 96 and 97, the latter are respectively acted upon by the pressure of the fluid in the conduits 60 and 7 which are respectively supplied by the pumps 26 and 2, so that the pressure upstream of the valve members 96 and 97 is substantially greater than the pressure downstream thereof. Inasmuch as the pump 26 supplies during normal operation more fuel than the injection pump 1 requires, the valve 96 is open and the excess fuel flows through return conduit means 98, 20 and overflow valve means 100—103 back to the reservoir 3.

Thus, the overflow valve means which includes the valve member 96 cooperates with the overflow valve means 74 for determining the pressure of the fluid in the conduit 60 so as to determine the pressure of the fluid in the chamber 63, and the pressure required to open the valve 96 is determined by the difference between the force of the spring 42 urging the valve member 96 to its closed position and the axial force exerted on the disc 114 by the ball members 37 which form a centrifugal means urging the disc 114 against the force of the spring 42. The valve member 97 together with the valve seat 119 of the overflow valve means which communicates with the conduit means 78, 7 for participating in the control of the hydraulic regulating means 9—11 acts to determine the pressure of the fluid in the conduit 7 only according to the axial force exerted on member 112 by the centrifugal means 37.

With pressure variations in the fluid in the conduit 7, the piston 10 will move in the cylinder 9, and as mentioned above, the axial position of member 13 will change so that the angular positions of the shafts 14 and 15 with respect to each other will also change, these angular positions being determined by the axial position of member 13. Inasmuch as variations in the pressure of the fluid in the conduit 7 are brought about solely by the changes in the speed of rotation of member 112 and thus by changes in the engine speed, the angular positions of the shafts 14 and 15 with respect to each other vary according to the same law, which is to say the structure maintains automatically between the shafts 14 and 15 angular positions with respect to each other which correspond to the engine speed. The throttling means 77 and 80 prevent any vibrations of the shaft 15 from acting through the member 13, lever 12, and piston 10 to undesirably move the piston 10, so that the throttling means 77, 80 in effect damps vibrations which might undesirably influence the piston 10 so that the latter cannot be moved except through variations in pressure of the fluid in the conduit 7.

When the engine is started there is as yet no pressure in the fluid in the conduit 7 since the valve member 97 is not urged to the left, as viewed in Fig. 2, at this time. As a result, the spring 87 locates the piston 83 to the left of the position thereof shown in Fig. 1 so that the conduit 60 is closed downstream of branch 62 between the later and conduit 73. As a result, all of the fluid under pressure delivered by the pump 26 to the conduit 60 and flowing therealong beyond the filter 6 acts through the conduit 62 on the piston 68, and the large pressure at this time serves to move the piston 68 to the right beyond its overload position shown in Fig. 1 against the force of the springs 67 and 69 so that the injection pump can at this time deliver to the engine amounts of fuel greater than the full load amounts, as is required for starting purposes.

The starting of the engine, however, which is connected through a suitable transmission with the pumps 26 and 2 for operating the latter, causes the pressure in the conduit 7 to increase sufficiently to shift the piston 83 to the right, as viewed in Fig. 1, until the stop pin 85 engages the right end wall of the cylinder 82, and the member 83 remains in this position, where it opens the conduit 60, during the continued operation of the engine.

During the operation of the engine the pressure of the fluid in the conduit 60, which controls the position of the piston 68, is determined by that one of the valve members 96 and 90 which can be opened with the smaller force.

The pressure required to open the valve 96, which pressure depends upon the speed of operation of the injection pump, is illustrated for two different settings of the lever 50 by the operator in Fig. 3 by the curves $p_3$ and $p_{31}$, respectively. In Fig. 3 the curves illustrate the relationship between the fluid pressures shown along the vertical coordinate and the rotary speed shown along the horizontal coordinate. The curves $p_3$ and $p_{31}$ are determined on the one hand by the rotary speed required to enable the centrifugal means 37 to act on the spring 42 to permit the pressure in the conduit 60 acting on the valve member 96 to open the latter, and this pressure of the fluid in the conduit 60 required to open the valve 96 will also be determined by the compression of the spring 42 which is determined by the setting of the lever 50. The pressure of the fluid in the conduit 60 required to open the valve 96 at one setting of the lever 50 is shown at the pressure $p_1$, and this pressure at another setting of the lever 50 is shown at $p_{11}$ in Fig. 3. On the other hand, the pressure required to open the valve member 96 is determined in part by the pressure shown at curve $p_2$ in Fig. 3, this pressure being the pressure of the fluid in the conduit 60 which varies with that of the variation in the speed and which is required to replace the force of the centrifugal means 37 acting against the spring 42. Thus, at the setting of lever 50 which provides the pressure $p_1$, the curve $p_3$ which indicates the pressure required to open the valve member 96 is determined by the difference between $p_1$ and the curve $p_2$, while the curve $p_{31}$ shows at different speeds the pressure required to open the valve 96 when the lever 50 has a different setting providing the pressure $p_{11}$, the curve $p_{31}$ being determined by the difference between $p_{11}$ and $p_2$.

The pressure required to open the valve 90 at different speeds is indicated by the curve $p_6$ in Fig. 3. This curve $p_6$ results from a number of factors one of which is the pressure $p_4$, this pressure being the pressure of the fluid in the conduit 60 required to move the valve member 90 to an open position against the force of the spring 92. The force of the spring 92 is carefully chosen so that the pressure $p_4$ is equal to the pressure of the fluid acting on the piston 68 to hold this piston in the full load position against the force of the spring 67 where this piston 68 is still in engagement with the ring 70 but has not moved the latter to the right, as viewed in Fig. 1, against the force of the spring 69.

The curve $p_6$ also depends upon the pressure $p_5$ which varies with the variations in speed and which is the pressure of the fluid in the conduit 60 required to replace the pressure of the fluid in the conduit 7 from acting on the valve 90 to urge the latter to an open position.

Thus, the curve $p_6$ which illustrates the pressure required to open the valve 90 is determined by the difference between the pressure $p_4$ and the pressure $p_5$.

Fig. 3 also illustrates the pressure $p_7$ which is the pressure in the conduit 60 and acting on the piston 68 in order to move the latter against the force of the spring 67 as well as against the force of the spring 69 together with the ring 70 so as to move the rod 65 to a position where enough fuel is supplied to the engine for starting purposes. This pressure $p_7$ is only reached at those times when the pressure in the conduit 7 is insufficient to maintain the piston 83 against the force of the spring 87 in the position shown in Fig. 1.

Thus, it may be seen from Fig. 3 that up to the speed $n_1$ the injection pump provides sufficient fuel for starting purposes, and the engine is then properly started. It will be noted that the curve $p_6$ intersects the curve $p_{31}$ at the speed $n_{21}$, and the curve $p_6$ intersects the curve $p_3$ at the speed $n_2$. Between the speeds $n_1$ and $n_{21}$ the pressure $p_6$ is less than the pressure $p_{31}$, so that the pressure in the conduit 60 and thus in the chamber 63 is determined by the valve 90, while beyond the speed $n_{21}$ the curve $p_{31}$ is at a lower pressure than the curve $p_6$, so that beyond the speed $n_{21}$ the pressure of the fluid in the conduit 60 and the chamber 63 is determined by the valve 96. In the same way, when the lever 50 is at a position corresponding to the pressure $p_1$, the curve $p_6$ is at a lower pressure up to the speed $n_2$, so that until this speed is reached the valve 90 controls the pressure of the fluid in the chamber 63, and beyond the speed $n_2$ the curve $p_3$ has the smaller pressure so that beyond this speed the pressure in the chamber 63 is determined by the valve 96. The parts are so designed that at the pressure $p_6$ which gradually falls as the speed increases the amounts of fuel delivered to the engine are the maximum amounts which can be efficiently burned, and it will be noted from Fig. 3 that at no time can the structure deliver more than the maximum amounts of fuel which can be sufficiently burned. However, beyond speeds such as the speeds $n_{21}$ and $n_2$ determined by the operator, the fuel supply system of the invention will deliver to the engine less than the maximum amounts of fuel which can be efficiently burned. The overflow valve means 100—103 prevents the conduits upstream of this overflow valve means from becoming empty of fluid so as to undesirably influence the operation of the structure.

It will be understood that each of the elements described above, or two or more together, may also find a useful application in other types of fuel supply systems differing from the types described above.

While the invention has been illustrated and described as embodied in an injection pump control, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a fuel supply system for an internal combustion engine, in combination, an injection pump; first hydraulic means cooperating with said injection pump for regulating the amount of fuel supplied thereby; second hydraulic means cooperating with said pump for controlling the timing thereof; and control means cooperating with said first and second hydraulic means for regulating the fluid pressure which actuates said first and second hydraulic means, said control means being responsive to the speed of an engine to which fuel is supplied by said injection pump for controlling said first and second hydraulic means according to the speed of the engine.

2. In a fuel supply system for an internal combustion engine, in combination, an injection pump; hydraulic means cooperating with said injection pump for regulating amounts of fuel delivered by the pump to the engine; and control means cooperating with said hydraulic means for controlling the latter to limit the amounts of fuel delivered by said injection pump to the maximum amounts which can be efficiently burned by the engine up to a predetermined engine operating speed higher than its idling speed and for then controlling said hydraulic means to regulate the injection pump to deliver to the engine amounts of fuel less than the maximum amounts which can be efficiently burned by the engine at engine speeds above said predetermined engine speed.

3. In a fuel supply system for an internal combustion engine, in combination, an injection pump; hydraulic means cooperating with said injection pump for regulating amounts of fuel delivered by the pump to the engine; control means cooperating with said hydraulic means for controlling the latter to limit the amounts of fuel delivered by said injection pump to the maximum amounts which can be efficiently burned by the engine up to a predetermined engine operating speed higher than its idling speed and for then controlling said hydraulic means to regulate the injection pump to deliver to the engine amounts of fuel less than the maximum amounts which can be efficiently burned by the engine at engine speeds above said predetermined engine speed; and means operable at the will of the operator and cooperating with said control means for determining said predetermined speed.

4. In a fuel supply system for an internal combustion engine, in combination, an injection pump; first hydraulic regulating means cooperating with said injection pump for regulating the amounts of fuel delivered thereby according to the fluid pressure of said first regulating means; second hydraulic regulating means cooperating with said injection pump for regulating the timing thereof in accordance with the fluid pressure of said second regulating means; first and second overflow valve means communicating respectively with said first and second hydraulic regulating means for controlling the fluid pressures thereof according to the positions of said first and second overflow valve means; and centrifugal means driven by the engine supplied by the injection pump and cooperating with said first and second overflow valve means for regulating the positions thereof, respectively.

5. In a fuel supply system for an internal combustion engine, in combination, an injection pump; first hydraulic regulating means cooperating with said injection pump for regulating the amounts of fuel delivered thereby according to the fluid pressure of said first regulating means; second hydraulic regulating means cooperating with said injection pump for regulating the timing thereof in accordance with the fluid pressure of said second regulating means; first and second overflow valve means communicating respectively with said first and second hydraulic regulating means for controlling the fluid pressures thereof according to the positions of said first and second overflow valve means; centrifugal means driven by the engine supplied by the injection pump and cooperating with said first and second overflow valve means for regulating the positions thereof, respectively; and spring means cooperating with said first overflow valve means for urging the latter to its closed position, said centrifugal means acting in opposition to said spring means.

6. In a fuel supply system for an internal combustion engine, in combination, an injection pump; first hydraulic regulating means cooperating with said injection pump for regulating the amounts of fuel delivered thereby according to the fluid pressure of said first regulating means; second hydraulic regulating means cooperating with said injection pump for regulating the timing thereof in accordance with the fluid pressure of said second regulating means; first and second overflow valve means communicating respectively with said first and second hydraulic regulating means for controlling the fluid pressures thereof according to the positions of said first and second overflow valve means; centrifugal means driven by the engine supplied by the injection pump and cooperating with said first and second overflow valve means for regulating the positions thereof, respectively; and a pair of pumps respectively communicating with said first and second regulating means for supplying fluid thereto.

7. In a fuel supply system for an internal combustion engine, in combination, an injection pump; first hydraulic regulating means cooperating with said injection pump for regulating the amounts of fuel delivered thereby according to the fluid pressure of said first regulating means; second hydraulic regulating means cooperating with said injection pump for regulating the timing thereof in accordance with the fluid pressure of said second regulating means; first and second overflow valve means communicating respectively with said first and second hydraulic regulating means for controlling the fluid pressures thereof according to the positions of said first and second overflow valve means; centrifugal means driven by the engine supplied by the injection pump and cooperating with said first and second overflow valve means for regulating the positions thereof, respectively; and a third overflow valve means communicating with said first hydraulic means and cooperating with said first overflow valve means for participating in the control of the fluid pressure of said first regulating means.

8. In a fuel supply system for an internal combustion engine, in combination, an injection pump; first hydraulic regulating means cooperating with said injection pump for regulating the amounts of fuel delivered thereby according to the fluid pressure of said first regulating means; second hydraulic regulating means cooperating with said injection pump for regulating the timing thereof in accordance with the fluid pressure of said second regulating means; first and second overflow valve means communicating respectively with said first and second hydraulic regulating means for controlling the fluid pressures thereof according to the positions of said first and second overflow valve means; centrifugal means driven by the engine supplied by the injection pump and cooperating with said first and second overflow valve means for regulating the positions thereof, respectively; and a third overflow valve means communicating with said first hydraulic means and cooperating with said first overflow valve means for participating in the control of the fluid pressure of said first regulating means, said third overflow valve means including a cylinder and a valve member having a stem portion which is slidable in said cylinder to act as a piston therein, said cylinder communicating with said second regulating means for increasing the pressure acting on said piston to urge said third overflow valve means toward its open position as the speed of the engine increases, so that the pressure of the fluid of said first regulating means required to open said third overflow valve means diminishes as the speed of the engine increases for limiting the amounts of fuel delivered by the injection pump to amounts no greater than those which can be efficiently burned by the engine.

9. In a fuel supply system for an internal combustion engine, in combination, an injection pump; first hydraulic regulating means cooperating with said injection pump for regulating the amounts of fuel delivered thereby according to the fluid pressure of said first regulating means; second hydraulic regulating means cooperating with said injection pump for regulating the timing thereof in accordance with the fluid pressure of said second regulating means; first and second overflow valve means communicating respectively with said first and second hydraulic regulating means for controlling the fluid pressures thereof according to the positions of said first and second overflow valve means; centrifugal means driven by the engine supplied by the injection pump and cooperating with said first and second overflow valve means for regulating the positions thereof, respectively; and additional valve means communicating with said first overflow valve means for preventing the operation thereof until the engine has been started and reaches a given speed.

10. In a fuel supply system for an internal combustion engine, in combination, an injection pump; first hydraulic regulating means cooperating with said injection pump for regulating the amounts of fuel delivered thereby according to the fluid pressure of said first regulating means; second hydraulic regulating means cooperating with said injection pump for regulating the timing thereof in accordance with the fluid pressure of said second regulating means; first and second overflow valve means communicating respectively with said first and second hydraulic regulating means for controlling the fluid pressures thereof according to the positions of said first and second overflow valve means; centrifugal means driven by the engine supplied by the injection pump and cooperating with said first and second overflow valve means for regulating the positions thereof, respectively; and additional valve means communicating with said first overflow valve means for preventing the operation thereof until the engine has been started and reaches a given speed, said additional valve means including a cylinder, a piston slidable therein and acting as a valve member and a spring acting on said piston for urging the same to a closed position, said cylinder communicating with said second hydraulic regulating means for urging said piston to the open position of said additional valve means against the force of said spring, so that the opening of said additional valve means is determined by the fluid pressure of said second hydraulic regulating means.

11. In a fuel supply system for an internal combustion engine, in combination, an injection pump; first hydraulic regulating means cooperating with said injection pump for regulating the amounts of fuel delivered thereby according to the fluid pressure of said first regulating means; second hydraulic regulating means cooperating with said injection pump for regulating the timing thereof in accordance with the fluid pressure of said second regulating means; first and second overflow valve means communicating respectively with said first and second hydraulic regulating means for controlling the fluid pressures thereof according to the positions of said first and second overflow valve means; centrifugal means driven by the engine supplied by the injection pump and cooperating with said first and second overflow valve means for regulating the positions thereof, respectively; a fluid reservoir communicating with said first and second hydraulic regulating means as well as with said first and second overflow valve means so that fluid may be supplied from said reservoir to said first and second regulating means and said first and second overflow valve means; return conduit means leading from said first and second overflow valve means back to said reservoir so that fluid which flows through said first and second overflow valve means will be returned to said reservoir; and third overflow valve means cooperating with said return conduit means and through which the fluid flows back to said reservoir, said third overflow valve means maintaining fluid in said return conduit means upstream of said third overflow valve means at a predetermined minimum pressure.

12. In a fuel supply system for an internal combustion engine, in combination, an injection pump; first hydraulic regulating means cooperating with said injection pump for regulating the amounts of fuel delivered thereby according to the fluid pressure of said first regulating means; second hydraulic regulating means cooperating with said injection pump for regulating the timing thereof in accordance with the fluid pressure of said second regulating means; first and second overflow valve means communicating respectively with said first and second hydraulic regulating means for controlling the fluid pressures thereof according to the positions of said first and second overflow valve means; centrifugal means driven by the engine supplied by the injection pump and cooperating with said first and second overflow valve means for regulating the positions thereof, respectively; and throttling means cooperating with said second hydraulic regulating means for throttling the flow of fluid to and from the same so as to insulate the fluid acting on said second regulating means from vibrations and the like.

13. A regulator for an injection pump, comprising, in combination, casing means; first and second conduit means each directing fluid to the interior of and away from the interior of said casing means; first and second overflow valve means located in said casing means and cooperating with said first and second conduit means for regulating the flow of fluid through each conduit means to and from the interior of said casing means; a shaft supported by said casing means in the interior thereof for axial shifting movement and having a free end located adjacent said first overflow valve means; spring means in said casing means acting on said shaft for urging the latter to shift axially in a direction which closes said first overflow valve means by pressure of said free end of said shaft on said first overflow valve means; a motion transmitting member freely turnable on said shaft and adapted to be rotated, said motion transmitting member having an elongated hub portion axially shiftable on said shaft and forming a valve member of said second overflow valve means; a disk connected to said shaft for axial movement therewith and located adjacent said motion transmitting member and defining with the latter an annular chamber surrounding said shaft and having an axial cross-section at each side of said shaft which becomes gradually smaller in a direction extending radially away from said shaft, said spring means urging said disk toward said motion transmitting member; and centrifugal weight members located in said chamber and connected with said motion transmitting member for rotation therewith and acting on said disk during rotation of said motion transmitting member for urging said disk away from said motion transmitting member, said weights acting centrifugally on said motion transmitting member for urging said elongated hub thereof toward the closed position of said second overflow valve means, so that said weights act on the one hand to tend to close said second overflow valve means as the speed of rotation of said motion transmitting member increases and act on the other hand to reduce the pressure required to open said first overflow valve means as the speed of rotation of said motion transmitting member increases.

References Cited in the file of this patent
UNITED STATES PATENTS

| | | |
|---|---|---|
| 2,177,120 | Schaeren | Oct. 24, 1939 |
| 2,810,376 | Aldinger | Oct. 22, 1957 |